3,407,930
METHOD AND APPARATUS FOR THE ELECTROSTATIC SORTING OF GRANULAR MATERIALS
Roger Claudius Marius Morel and Pierre Tauveron, Grenoble, Isere, France, assignors to Sames, Societe Anonyme de Machines Electrostatiques, Paris, France, a company of France
Continuation-in-part of application Ser. No. 377,917, June 25, 1964. This application May 19, 1965, Ser. No. 456,945
Claims priority, application France, June 27, 1963, 939,522; May 21, 1964, 4,690
15 Claims. (Cl. 209—11)

ABSTRACT OF THE DISCLOSURE

A multi-constituent mixture of particles is fluidized within an open-top container to form a fluidized bed of particles. The particles are heated and become charged predominantly by contact-electrification such that a particular constituent has a charge of given polarity. The particles of the given polarity are withdrawn from the bed by an electrostatic extracting field which extends from within the container to a conveyor which is spaced above the upper surface of the bed. In some cases the bed is subjected to vibrations to further facilitate the selective charging of the particles.

---

Figure 1:
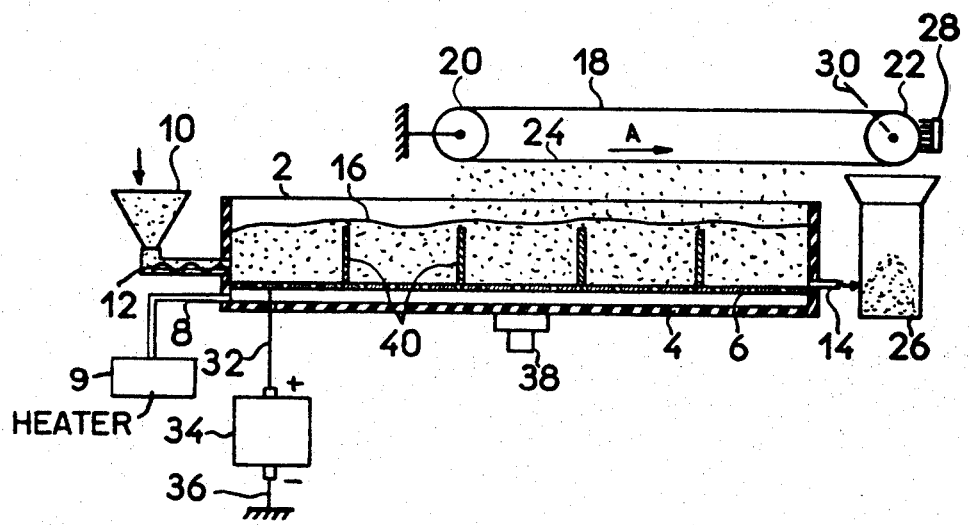

This application is a continuation-in-part of U.S. application Ser. No. 377,917 filed June 25, 1964, by Roger C. M. Morel and Pierre Tauveron.

The present invention relates to a method for the electrostatic sorting of powdered or granular particles and to apparatus for carrying out this method.

In electrostatic separation processes and apparatus of the type to which the present invention is directed, a mixture of particles to be sorted is converted into a fluidized bed of particles, and the particles are selectively charged. The particles are then exposed to an electrostatic field which induces a spacial separation on the basis of the selective charge of the individual constituents of the mixture.

In one known system of this general type, the electrostatic field is established between a pair of horizontally spaced electrodes of opposite polarity. The mixture of particles is charged prior to being introduced into the fluidized bed, and the particles are then exposed to the electrostatic field. The particles of one polarity are attracted toward one of the electrodes, while the particles of the opposite polarity are attracted toward the other electrode. When the separation of the particles is complete, the individual groups of particles must be removed from the fluidized bed by suitable mechanical extracting means.

Prior methods and apparatus of the foregoing type have exhibited certain disadvantages. For example, the removal of the separated particles from the fluidized bed often has proved difficult and has necessitated the use of comparatively complicated extracting equipment. As another illustration, difficulties were encountered heretofore in insuring that only the particular particles selected for separation received a charge of given polarity. These latter difficulties frequently resulted in a separation different from the desired separation with the result that the separated particles included impurities which impaired the suitability of the particles for their intended purpose.

One general object of this invention, therefore, is to provide a novel and economical method and apparatus for the electrostatic sorting of particles.

More specifically, it is an object of this invention to provide such method and apparatus in which the need for employing complicated extracting equipment to withdraw the separated particles from the fluidized bed is eliminated.

Another object of the invention is to provide a continuous process for electrostatically separating a particular constituent of a multi-constituent mixture of particles from the remaining constituents.

A further object of the invention is to provide new and improved apparatus for the electrostatic sorting of particles which is economical to manufacture and thoroughly reliable in operation.

In accordance with one illustrative embodiment of the invention, a gaseous stream is directed into a multi-constituent mixture of particles to be separated to form a fluidized bed of the particles. The thus fluidized particles are heated to an elevated temperature and are selectively charged such that the particles of a particular constituent of the mixture have a charge of given polarity. An electrostatic extracting field is established within the fluidized bed which separates the particles of the given polarity from the remaining particles in the bed.

In accordance with one feature of the invention, the selective charging of the particles is accomplished at least predominantly by what will be referred to herein as contact-electrification, resulting in the formation of charges of different polarity on particles of different constituents. The arrangement is such that the need for various ancillary electrical means to form the desired charges on the particles is substantially eliminated.

In accordance with another feature of the invention, the electrostatic field, in addition to separating the particles of a particular constituent of the mixture from the remaining particles, is effective to withdraw the separated particles from the fluidized bed. The remaining particles, on the other hand, are retained in the bed. In several particularly advantageous embodiments, the extracting field extends in a generally vertical direction from within the bed to an electrode which is located above the container for the fluidized particles. The separated particles are withdrawn upwardly by the field from the bed without the necessity for employing mechanical extracting equipment.

In accordance with a further feature of the invention, in certain embodiments, the fluidized bed is subjected to vibrations which further facilitate the selective charging of the partcles. In some cases a similar result is achieved by introducing a multiplicity of freely movable elements into the bed. These elements, which illustratively comprise small beads of non-conductive material, assume random motions of limited amplitude within the bed to substantially increase the effectiveness of the contact-electrification action on the particles.

In certain advantageous embodiments, a collector member of electrically conductive material is disposed above the fluidized bed, and the extracting field is established between the collector and the bed. The particles in the bed which are charged to the given polarity are electrostatically transferred to the collector, while the remaining particles are retained in the bed.

In other embodiments, the extracting field, rather than being applied directly between the fluidized bed and the collector member, is applied from the bed to a plate electrode which is arranged in spaced relationship with the collector. The use of this latter electrode provides an additional improvement in the electrostatic field between the bed and the collector.

In accordance with several embodiments, the collector member is in the form of an endless conveyor belt which is operated to provide continuous sorting of the particles within the fluidized bed. As a result, the over-all efficiency of the system is further improved.

Figure 2:
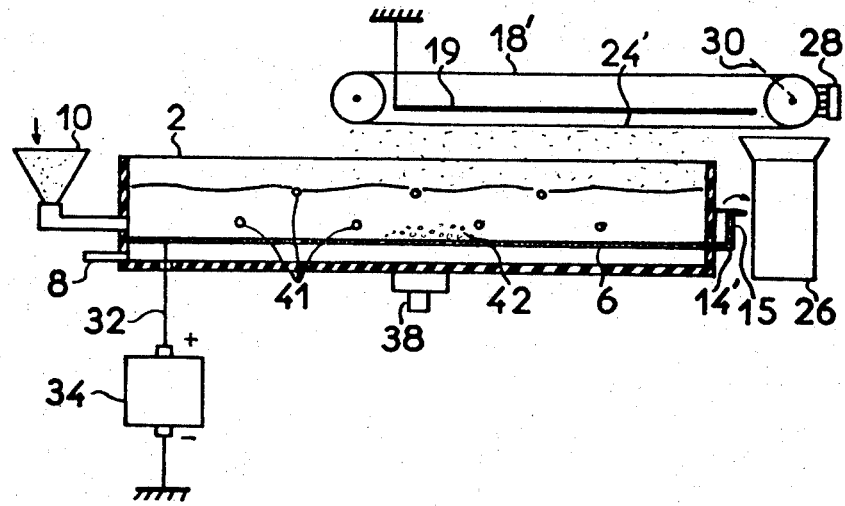

The foregoing and other objects and advantages of the invention will appear more clearly and fully from the following description, given by way of example, of various preferred embodiments, reference being made to the accompanying drawings, in which:

FIGURE 1 is a schematic representation, with certain parts shown in vertical section, of sorting apparatus in accordance with one illustrative embodiment of the invention for carrying out the method according to the invention; and FIGURE 2 is a schematic representation in general similar to FIGURE 1 but illustrating another illustrative embodiment of sorting apparatus adapted to carry out the method.

Referring to FIGURE 1, an open tank 2 of electrically non-conductive material forms a container for the particles to be sorted. The tank 2 is of rectangular cross-section and is provided with a bottom wall and a horizontal porous wall 6 which serves as a floor for the particles. This latter wall is fabricated of electrically conductive or semi-conductive material, such as sintered brass or other sintered powder metal, for example. In some embodiments, the wall 6 comprises a rigid porous plate, while in other arrangements the wall is in the form of a wire screen of sufficiently fine mesh to support the particles.

The wall 6 is arranged in spaced relationship with the bottom wall 4 to form a chamber therebetween. A stream of compressed air or other fluidizing gas is directed into this chamber from a pipe 8. The gas passes through the porous wall 6 to bring the particles within the container 2 to an agitated or fluidized state and thereby forms a fluidized bed of the particles.

Spaced above the open upper portion of the tank 2 is a collector member in the form of an endless conveyor belt 18. The belt 18 is formed of electrically conductive material, such as graphite-containing rubber sheet, for example, and is arranged for continuous movement along a closed path between two pulleys 20 and 22. The pulley 22 is connected to a suitable power source, as shown schematically by the dash line 30, to direct the belt 18 along its path at a substantially uniform rate. The belt 18 is offset longitudinally with respect to the tank 2 in the direction of feed of the particles through the tank. That is, the pulley 20 is positioned above a point intermediate the ends of the tank, say a point situated a distance from the infeed end wall of the tank (the left end, as viewed in FIGURE 1) which may be from about one-fourth to one-half the full length of the tank, while the pulley 22 is located somewhat beyond the opposite end wall of the tank so as to overlie a discharge receptacle or hopper 26. The lower horizontal reach 24 of the belt is in spaced juxtaposition with the tank and is continuously driven in the direction of the arrow A toward a collecting station. A brush 28 or other particle removing means cooperates with the pulley 22 at the collecting station and is disposed immediately above the hopper 26.

The tank 2 is provided with a material feed unit which includes a feed hopper 10 and an auger screw 12. The screw 12 is interposed between the bottom of the hopper 10 and the inlet end of the tank and is connected to the adjacent tank wall somewhat above the level of the porous fluidizing plate 6. Instead of the screw 12, a simple gravity feeder may be employed in certain types of installations. The feed unit is effective to provide a continuous feed of the particles to be separated into the tank.

Connected with the end wall of tank 2 remote from the feeder unit is an outlet 14. The cross-sectional area of this outlet is suitably calibrated to discharge from the tank 2 the residual constituents of the mixture of particles which have not been separated out in the manner presently to be described. If desired, the outlet 14 illustratively may be formed as a syphon.

The conductive fluidizing element or porous plate 6 is electrically connected by an insulated conductor 32 to one terminal, e.g., the positive terminal, of a high-voltage source 34 of direct-current power. The source 34 comprises an electrostatic generator having a D-C output voltage of the order of 40 to 60 kilovolts or more. The other terminal of the source 34 is connected through an insulated conductor 32 to ground. The conductive conveyor belt 18 similarly is connected to ground through the pulley 20.

In the operation of the system, a mixture of powder constituents is preliminarily ground or otherwise comminuted to a degree sufficient to achieve substantially total liberation of the particular constituent to be separated. The mixture is then continuously fed into the hopper 10 and is introduced into the tank 2 by the auger 12. Compressed air at suitable pressure and velocity is directed through the inlet 8 and upwardly through the perforations in the horizontal wall 6 to convert the mixture in the tank into a fluidized bed. The characteristics of a fluidized bed of particles are well understood, and it is known that such a bed behaves in many respects as a body of liquid. That is, the powder particles are suspended in a state of extreme mobility by the many minute upward jets of gas issuing through the perforations in the wall 6 so that the particles resemble the molecules of a liquid, and the body of powder as a whole obeys the laws of hydrostatics as would a body of liquid. The suspended particles rise in the tank to an upper level 16 which resembles the free level of a liquid. The elevation of the level 16 is determined by the relative rates of input and discharge flow through the auger 12 and the discharge orifice 14, respectively. Under steady-state conditions of the input and discharge flow rates, the elevation of the level 16 remains constant.

The compressed air stream entering the tank 2 through the inlet 8 is heated by a heater 9 to a predetermined elevated temperature to similarly raise the temperature of the fluidized particles. Although the particular temperature of the particles may vary over a comparatively wide range, for best results the particle temperature is uniformly maintained within the range of from about 60° C. to about 100° C. By holding the temperature of the particles within this range, the charging or electrification thereof is substantially improved.

The electrification of the particles within the fluidized bed proceeds essentially by contact or frictional electrification, resulting in the production of charges of different denomination on particles of different constituents. As an illustration, in some embodiments the particles of a useful constituent that is to be separated out of the mixture receive a positive charge, while other constituent particles receive a negative charge. Under these conditions, the positively charged particles find themselves in the midst of an electrostatic field created between the conductive porous plate 6 serving as a positive lower electrode and the belt reach 24 which serves as a negative (grounded) upper electrode. The positively charged particles are swept up by the lines of force of this field and are attracted to the reach 24, to which they cling by electrostatic attraction. With the reach 24 moving in the direction of the arrow A, these particles are conveyed to the discharge or collecting station where they are brushed off the belt 18 by the brush 28 and drop into receiving hopper 26. The particles remaining in the tank 2, which comprise constituents electrified to a negative polarity, are discharged from the outlet 14. If desired, these latter particles may be recycled either through the same apparatus or another generally similar one.

As noted above, the selective charging of the powder particles in the separating apparatus is effected primarily by contact or frictional electrification. It should here be observed that the static electrification of solids, although a physical phenomenon well known in the art, is of such extreme complexity that it is only just beginning to be understood and the available data is almost wholly empirical. Leonard B. Loeb of the University of California, Berkeley, Cal., in Static Electrification (Springe Verlag, Germany 1958), a classical textbook on the subject, refers to two main types of static electrification by contact between solids. One is the so-called contact or Volta electrification occurring between clean dry metal-to-metal or metal-to-semiconductor surfaces, a consequence of the transfer of electrons at different energy levels across the contacting boundaries. The other type of contact electrification, in the words of Loeb (op. cit. p. 2), "should in most instances more properly be called contact electrification and occurs as a result of impacts leading to contact between two dry solid surfaces and subsequent separation. This usually involves contact between dissimilar surfaces, e.g., two insulating solids, or an insulator and a metal . . . . It involves the transfer of electrons or ions between the two surfaces." In the present application, the phrase "contact-electrification" will be understood as designating either of these types, although the second type is believed to predominate. Loeb's work also indicates (Chap. IV, sec. D2) that "symmetrical charging will be present whenever solid surfaces are disrupted and contacts broken." It is believed that this is an apt description of the manner in which electrification essentially proceeds in the fluidized-bed separator of the invention.

The porous plate 6 serves as the supporting floor for the fluidized particles and is made from electrically conductive or semi-conductive material, as indicated heretofore. Because the plate 6 is at a comparatively high voltage, those particles which come in contact therewith may acquire some degree of charge through conductance. However, the fluidizing gas moving through the plate and the orientation of the plate adjacent the bottom of the container 2 serve to prevent any substantial number of particles from acquiring an appreciable charge in this manner, and the selective charging of the particles takes place predominantly by the contact-electrification process discussed above.

Whatever the precise theory involved, it is evident that in many useful instances mixtures of powder constituents, such as various natural ores, plastic powders and the like, are able to acquire selective charges of different polarity on their respective constituents when subjected to the repeated impacts and contact-and-separation between particles that occur when the mixture is agitated in a fluidized bed. The acquired charges are augmented by the heat applied through the agency of the fluidizing air and are of a magnitude such that the selected particles of a given polarity rise in opposition to gravity to the height required for them to be effectively removed by the conveyor belt 18.

In certain advantageous embodiments of the invention, means are provided for further increasing the effectiveness of the contact-electrification occurring in the fluidized bed.

According to some of these embodiments, the effectiveness of the charging process is greatly enhanced by suitably vibrating the fluidized bed. For this purpose, there is employed a vibrator unit 38 of conventional construction which is associated with the tank 2. The unit 38 may be of any suitable kind and illustratively includes a 50 c.p.s. induction motor which is mechanically connected to the bottom wall 4 of the tank for imparting vibrations thereto. The vibration of the particles is further enhanced by providing an arrangement for effectively transmitting the vibrations from the exterior walls of the tank into the innermost regions of the bed. For this purpose there is employed a plurality of rigid partitions or cross walls 40. The walls 40 interconnect the side walls of the tank 2 at spaced points and preferably are made of electrically insulating material. With the provision of the walls 40 in conjunction with the vibrator means 38, the effectiveness of the charging and consequent separation of particles is very substantially increased. It is believed that the walls 40 operate in two different ways to enhance the charging process. First, as indicated above, the cross walls serve to transmit the vibrations generated by the vibrator 38 from the exterior walls of the tank into the innermost regions of the fluidized bed so that the bed as a whole participates effectively in the vibratory motion. This increases the energy and momentum involved in the mutual impacts as well as the frequency of impact and the friction to which the powder particles are subjected, thereby increasing the rate of contact electrification. Secondly, the cross walls, especially when made from materials such as epoxy resin, inter alia, appear to act as auxiliary or intermediary carrier-transfer surfaces which multiply many times the transfer of charge carriers between the particles of different constituents of the powder mix. It is to be understood that the vibration-transferring members 40 need not necessarily interconnect opposite side walls of the tank but may project only part of the distance across the fluidized bed.

In the modified embodiment of FIGURE 2, one difference that has been introduced is the substitution of spaced cross bars 41 for the partitions 40. The cross bars 41 preferably are fabricated of poorly conductive or insulating material, and their action is generally similar to that of the crosswalls 40.

The apparatus of FIGURE 2 exemplifies a somewhat different arrangement for creating the vertical extracting field and collecting the extracted powder particles. The conveyor belt 18' of FIGURE 2 is made of poorly conductive material. The apparatus includes a horizontal plate electrode 19 which is positioned above the lower reach 24' of the belt and is connected to ground. With this arrangement, the positively charged particles of the powder mixture are raised out of the fluidized bed along the lines of force created between the lower electrode provided by the porous plate 6 and the upper electrode 19. The upward movement of these particles is arrested before they reach the electrode 19 by the lower reach 24', and the particles adhere to the reach 24' and are conveyed by the belt 18' to a collecting station in a manner similar to that described heretofore.

In several good arrangements, the electrification of the powder particles in the fluidized bed is even further improved by introducing a body of small mobile elements 42 into the fluidizing tank 2. The elements 42 preferably comprise small spheres or beads of poorly conductive or insulating material, such as epoxy resin, which remain permanently within the tank. The elements are of a size and weight such that they move randomly amongst the particles of the fluidized bed under the effect of the jets of fluidizing gas discharged through the pores in the plate 6. The amplitude of these random movements, however, is limited to prevent the lifting of the elements to an excessive height above the plate. While the appropriate range for the size and weight of the elements may vary greatly depending on the particular operating conditions, in the case of spheres of epoxy resin an illustrative range of diameters is from about 2 to about 20 millimeters. If the elements have diameters below the lower limit of this range, suitable measures preferably should be taken to prevent their escaping out of the tank through the outlet 14 (FIGURE 1). For this purpose, the apparatus of FIGURE 2 includes a residual powder outlet 14' which includes an upwardly directed lip 15 to provide a syphon type outlet.

The spherical elements 42 are believed to act primarily as auxiliary charge transfer means which assist in the transfer of charge carriers between the constituents of the powder mix. The electric charges which are imparted to the particles under given circumstances and in a given time are even further increased by the provision of these elements.

It will be apparent that the cross bars 41, the cross walls 40 and the mobile elements 42 possess important basic features in common. All of these various means provide auxiliary surfaces, preferably of a poorly conductive character, which are situated within the fluidized bed and act to increase the electrification of the fluidized particles by increasing the contact area, multiplying the number of impacts with and between the particles, providing intermediate charge-transfer surfaces between the particles of the various constituents, and facilitating the transfer of vibrations from the tank side walls into the fluidized bed. It is again emphasized that in view of the rudimentary knowledge at present available about the detailed mechanisms of static electrification, the precise manner of operation of the auxiliary surfaces within the fluidized bed, cannot be fully explained. However, the provision of such auxiliary surfaces, whether the surfaces be fixed to the tank or freely movable with respect thereto, increases the electrification of the fluidized particles to such an extent that extremely strong charges are built up on the fluidized particles.

In the operation of the separator apparatus, an effective degree of electrification of the powder particles in the fluidized bed illustratively is achieved at the end of about from one to three minutes. Accordingly, the economy of the process is improved if the extracting electrostatic field is only brought to bear on the fluidized bed after the bed has remained exposed to electrifying conditions for a corresponding period of time. It is for this reason that the upper field-creating electrode, such as the conductive conveyor belt 18 in FIGURE 1 or the plate electrode 19 in FIGURE 2, is displaced or offset longitudinally a substantial distance from the input end of the fluidizing tank 2. There is thus provided an initial precharging zone in which no extracting field is present and in which the particles have the opportunity to become effectively charged. The length of this pre-charging zone depends in part on the rate of flow of the material through the tank and preferably is predetermined so that the dwell time of the fluidized bed in the pre-charging zone is not less than about one minute and does not exceed about three minutes.

In order more clearly to disclose the nature of the present invention, the following examples illustrating the invention are disclosed. It should be understood, however, that this is done solely by way of example and is intended neither to delineate the scope of the invention nor limit the ambit of the appended claims.

EXAMPLE 1

Apparatus according to FIGURE 1 was constructed with the following principal dimensions: length of tank—2 meters; width of tank—1 meter; height from porous plate 6 to lower reach 24 of the conveyor belt—12 centimeters; length from input end of tank to conveyor input pulley 20—about 1 meter. The porous plate 6 was fabricated of sintered brass and had a porosity such that, with an air pressure of 1.5 atmospheres below the plate, the rate of air flow through the plate was about 750 liters per second. The conveyor belt 18 was made of graphite-containing sheet rubber and was movable along its endless path at various linear velocities, from 5 to 50 centimeters per minute. An electrostatic generator, available commercially from SAMES U.S.A., Inc., 269 Commercial Avenue, Palisades Park, New Jersey, was used as the power source 34. This generator produced a 40 kilovolt potential at the positive terminal 32.

A phosphate ore containing about 45% phosphates, 39% calcite ($CaCO_3$), 15% quartz ($SiO_2$) and about 1% miscellaneous constituents, essentially glauconite, was crushed to a particle size which ranged from about 40 to 250 microns. The phosphate constituent in the crushed ore was entirely liberated, as shown by microscopic examination. The ore was fed into the tank inlet hopper 10 at a rate of 40 kilograms per minute.

The air inlet 8 was connected to a source of air at a pressure of 1.5 atmospheres, and the air was heated to a temperature of about 80° C. As the air moved through the porous plate 6, the bed of ore in the tank became fluidized and rose to a height of about 6 cm. above the baseplate 6, i.e., about halfway to the surface of the lower reach 24 of the conveyor. The vibrator unit 38 was operated to generate vibrations at a frequency of 50 c.p.s. with a power expenditure of 450 watts. The apparatus was run for a few minutes with the porous plate 6 disconnected from the 40 kilovolt source terminal to ensure a full initial electrification of the particles. The power source was then energized, and it was observed that a darker powder constituent rose at once above the free level of the fluidized bed throughout the one meter long output half of the tank. The darker constituent clung to the underside of the conveyer reach 24 where it formed a deposit one millimeter or more in depth. The depth of this deposit depended, of course, on the linear velocity at which the conveyor belt was displaced. Conveyor velocities of from 5 to 50 centimeters per second were all found to be satisfactory.

The deposit brushed off the conveyor belt and collected in hopper 26 was examined microscopically and found to be practically pure phosphate material without contamination by the remaining constituents of the ore. The remaining constituents remained in the fluidized bed until their removal through the outlet conduit 14.

EXAMPLE 2

In the above example, the polarities were reversed, the porous plate 6 being connected to ground and the conveyor belt 18 being connected to the 40 kilovolt terminal. In operation, the conveyor belt reach 24 became rapidly coated with a light-coloured deposit of calcite, silica and glauconite, which was almost completely free of any phosphate material. It was apparent from these examples that, regardless of the potential to which the conductive baseplate 6 is carried and the sense of the electrostatic field created above it, the phosphate constituent in the mixture tested is charged to a positive potential and the remaining constituents are charged to negative potentials by the method of contact electrification.

EXAMPLE 3

Example 1 was repeated but with the vibrator 38 deenergized. At a high rate of feed, it was found that a substantial proportion of the phosphate constituent failed to be attracted to the conveyor belt but was carried out with the residual mixture to outlet 14. The rate of feed of the material was then progressively reduced, and it was found that when the rate was brought down to about 23 kilograms per minute complete separation of the phosphate was again accomplished. This example established that, while the use of the vibrator was not essential for some commercial applications, the vibration of the particles produced a substantial improvement in the efficiency of the electrification.

EXAMPLE 4

The same experiment was performed after a charge of spherical particles of epoxy resin had been introduced into the tank 2. With the vibrator unit shut down, full separation of the phosphate occurred at a maximum rate of feed which was considerably in excess of the 23 kilograms per minute feed rate achieved in Example 2.

It was apparent from the above examples that the maximum separation efficiency of the fluidized bed electrostatic separator apparatus is obtained by applying vibrations to the tank and simultaneously using vibration-transferring members such as the rigid cross walls 41. A less high though still an appreciable improvement in yield was achieved through the use of freely movable spheres in the tank.

Tests were also carried out with potassium ores, including sylvite and halite, with generally comparable results.

It is contemplated that the separating process and apparatus of the invention may be usable with other ores and particle mixtures other than ores, such as with plastic resins, for example. It is noted in this respect that the process and apparatus of the invention probably are of broader applicability than might at first appear, in that almost all multi-constituent particulate mixtures when subjected to the fluidized bed contact electrification system according to the invention tend to take on different-polarity charges on their different constituents, with one (or sometimes more) constituents assuming one polarity and the remaining constituents assuming the opposite polarity.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a method of electrostatically separating a multi-constituent mixture of particles, the steps of fluidizing the mixture in a container therefor to form a fluidized bed of said particles, the upper portion of said container being open to permit the free discharge of particles therefrom, selectively charging the particles while in a fluidized state within said container predominantly by contact-electrification, the particles of a particular constituent of the mixture having a charge of given polarity different from the charge on the remaining particles, and exposing the fluidized particles to an electrostatic extracting field extending in a generally vertical direction from within said container to an electrode located above the upper portion of said container, the particles of said given polarity being withdrawn upwardly by said field out of the open upper portion of said container and being retained on said electrode while said remaining particles being retained in said bed.

2. In a method of electrostatically separating a multi-constituent mixture of particles, the steps of directing a gaseous stream into a container for the particles to be separated to form a fluidized bed of said particles, the upper portion of said container being open to permit the free discharge of particles therefrom, heating said particles to an elevated temperature, selectively charging the particles predominantly by contact-electrification, the particles of a particular constituent of the mixture having a charge of given polarity different from the charge on the remaining particles, and exposing the fluidized particles to a substantially constant electrostatic extracting field extending in a generally vertical direction from within said container to an electrode located above the upper portion of said container, the particles of said given polarity being withdrawn upwardly by said field out of the open upper portion of said container and being retained on said electrode while said remaining particles being retained in said bed.

3. In a method of electrostatically separating a multi-constituent mixture of particles, the steps of fluidizing the mixture to form a fluidized bed of said particles, heating said particles to an elevated temperature, vibrating the fluidized bed, retaining said particles within the vibrating fluidized bed for a length of time sufficient to selectively charge said particles while in a fluidized state predominantly by contact-elctrification, the particles of a particular constituent of the mixture having a charge of given polarity different from the charge on the particles of other constituents, and exposing the fluidized particles to an electrostatic extracting field, the particles of said particular constituent being withdrawn substantially solely by said field from said fluidized bed and the particles of said other constituents being retained in said bed.

4. In a method of electrostatically separating a multi-constituent mixture of particles, the steps of fluidizing the mixture to form a fluidized bed of said particles, heating said particles, heating said particles to an elevated temperature, vibrating the outer boundaries of the fluidized bed and transferring the vibration from said outer boundaries to the innermost regions of the bed, to selectively charge said particles while in a fluidized state predominantly by contact-electrification, the particles of a particular constituent of the mixture having a charge of given polarity different from the charge on the particles of other constituents, and exposing the fluidized particles to an electrostatic extracting field, the particles of said particular constituent being withdrawn substantially solely by said field from said fluidized bed and the particles of said other constituents being retained in said bed.

5. In a method of electrostatically separating a multi-constituent mixture of particles, the steps of fluidizing the mixture to form a fluidized bed of said particles, heating said particles to an elevated temperature, introducing a multiplicity of freely movable elements into said fluidized bed, said elements assuming random motions of limited amplitude within said bed and contacting said particles to selectively charge the same while in a fluidized state predominantly by contact-electrification, the particles of a particular constituent of the mxiture having a charge of given polarity different from the charge on the particles of other constituents, and exposing the fluidized particles to an electrostatic extracting field, the particles of said particular constituent being withdrawn substantially solely by said field from said fluidized bed and the particles of said other constituents being retained in said bed.

6. A method of the character set forth in claim 5, in which the elements introduced into said fluidized bed comprise beads of substantially non-conducting material.

7. A method of electrostatically separating a multi-constituent mixture of particles, comprising the steps of fluidizing the mixture to form a fluidized bed of said particles, heating said particles to an elevated temperature, advancing the fluidized particles along a substantially horizontal feed path in said bed through a charging zone and then through a separating zone, selectively charging the particles while moving in a fluidized state through said charging zone predominantly by contact-electrification, the particles of a particular constituent of the mixture having a charge of given polarity different from the charge on the particles of other constituents, establishing an electrostatic extracting field extending in a generally vertical direction within said separating zone, said extracting field separating the particles of said given polarity from the remaining particles in said separating zone, the separated particles being withdrawn upwardly from said bed, substantially solely by said extracting field, collecting the thus withdrawn particles, and removing the residual mixture from said bed.

8. A method of electrostatically separating a multi-constituent mixture of particles, comprising the steps of fluidizing the mixture in a container therefor to form a fluidized bed of said particles, the upper portion of said container being open to permit the free discharge of particles from said upper portion, heating said particles to a predetermined elevated temperature, advancing the fluidized parties along a substantially horizontal feed path in said container through a charging zone and then through a separating zone, vibrating the particles moving through said charging zone to selectively charge the same while in a fluidized state predominantly by contact-electrification, the particles of a particular constituent of the mixture having a charge of given polarity different from the charge on the particles of other constituents, establishing an electrostatic extracting field extending in a generally vertical direction from within said separating zone to an electrode located above the open upper portion of said container, said extracting field separating the particles of said given polarity from the remaining particles in said separating zone and withdrawing the separated particles out of the open upper portion of said container, said separated particles being attracted to said electrode and being retained thereon, collecting the thus withdrawn particles, and removing the residual mixture in said bed from said separating zone.

9. A method of electrostatically separating a multi-constituent mixture of particles, comprising the steps of directing a gaseous stream into a container for the particles to be separated to form a fluidized bed of said particles, the upper portion of said container being open to permit the free discharge of particles from said upper portion, heating said gaseous stream to raise the temperature of said particles to within the range of from about 60° C. to about 100° C., continuously advancing the fluidized particles along a substantially horizontal feed path in said container through a charging zone and then through a separating zone, introducing a multiplicity of freely movable elements into said fluidized bed, said elements assuming random motions of limited amplitude within said bed and contacting said particles to selectively charge the same while in a fluidized state predominantly by contact-electrification, the particles of a particular constituent of the mixture having a charge of given polarity different from the charge on the particles of other constituents, establishing an electrostatic extracting field extending in a generally vertical direction from within said separating zone to an electrode located above the open upper portion of said container, said extracting field separating the particles of said given polarity from the remaining particles in said separating zone and withdrawing the separated particles out of the open upper portion of said container, said separated particles being attracted to said electrode and being retained thereon, collecting the thus withdrawn particles, and continuously removing the residual mixture in said bed from said separating zone.

10. Apparatus for electrostatically separating a multi-constituent mixture of particles comprising, in combination, a container for the particles to be separated, said container having a perforate base plate for supporting said particles, having side walls extending upwardly from said base plate and having an open top to permit the free discharge of particles therefrom, means for discharging a fluidizing gas into said container through said perforate base plate to form a fluidized bed of said particles, means for heating said particles to an elevated temperature, means cooperating with said container for selectively charging the fluidized particles while in a fluidized state predominately by contact-electrification, the particles of a particular constituent of the mixture having a charge of given polarity different from the charge on the particles of other constituents, and electrode means positioned above said container for establishing substantially constant electrostatic extracting field with said base plate, said extracting field separating the particles of said given polarity from the remaining particles in said bed and withdrawing the separated particles upwardly out of the open top of said container.

11. Apparatus for electrostatically separating a multi-constituent mixture of particles comprising, in combination, a container for the particles to be separated, said container having an electrically conductive base plate for supporting said particles, having side walls extending upwardly from said base plate and having an open top to permit the free discharge of particles therefrom, means for fluidizing the particles in said container to form a fluidized bed of said particles, means for heating said particles to an elevated temperature, means for applying a high electrical potential to said base plate to selectively charge the fluidized particles while in a fluidized state predominately by contact-electrification, the particles of a particular constituent of the mixture having a charge of given polarity different from the charge on the particles of other constituents, electrode means positioned adjacent said container for establishing an electrostatic extracting field with said base plate, said extracting field separating the particles of said given polarity from the remaining particles in said bed and withdrawing the separated particles upwardly out of the open top of said container, means including an endless conveyor belt having one reach in spaced relationship with said container for collecting the thus withdrawn particles, said withdrawn particles electrostatically adhering to said one reach.

12. Apparatus for electrostatically separating a multi-constituent mixture of particles comprising, in combination, a container for the particles to be separated, said container having an inlet end and an outlet end spaced from said inlet end and including an electrically conductive perforate base plate for supporting said particles, including side walls extending upwardly from said base plate and including an open top to permit the free discharge of particles therefrom, feeding means connected to said inlet end for continuously introducing said particles into said container, means for fluidizing the particles in said container to form a fluidized bed of said particles, means for heating said particles to an elevated temperature, means cooperating with said container for selectively charging the fluidized particles while in a fluidized state predominately by contact-electrification, the particles of a particular constituent of the mixture having a charge of given polarity different from the charge on the particles of other constituents, electrode means for establishing with said base plate an electrostatic extracting field adjacent said fluidized particles, said electrode means being located above the upper portion of said container, said extracting field separating the particles of said given polarity from the remaining particles in said bed and withdrawing the separated particles in an upward direction out of the open top of said container, means in spaced relationship with said bed for collecting the thus withdrawn particles, and means connected to the outlet end of said container for continuously removing said remaining particles therefrom.

13. Apparatus for electrostatically separating a multi-constituent mixture of particles comprising, in combination, a container for the particles to be separated, said container having a plurality of upstanding side walls and a horizontally extending perforate base plate for supporting said particles, the top of said container being open to permit the free discharge of particles therefrom, means for discharging a fluidizing gas into said container through said base plate to form a fluidized bed of said particles, means for heating said particles to an elevated temperature, vibrator means connected to said container for vibrating fluidized particles therein to selectively charge the same while in a fluidized state predominately by contact-electrification, the particles of a particular constituent of the mixture having a charge of given polarity different from the charge on the particles of other constituents, electrode means positioned above the open top of said container for establishing an electrostatic extracting field with said base plate, the particles of said given polarity being separated from the remaining particles in said bed and being withdrawn upwardly out of said open top substantially solely by said electrostatic extracting field, and means in spaced relationship with the upper portion of said container for collecting the thus withdrawn particles.

14. Apparatus of the character set forth in claim 13, in which said perforate base plate is of electrically conductive material and cooperates with said electrode means to establish said electrostatic extracting field.

15. Apparatus for electrostatically separating a multi-constituent mixture of particles comprising, in combination, a container for the particles to be separated, said container having a plurality of interior members mounted therein and having an open top, means for feeding said particles into said container, means for directing a fluidizing gas into said container to form a fluidized bed of said particles, means for heating said particles to an elevated temperature, vibrator means connected to the exterior of said container for vibrating the same, the vibrations being transmitted by said interior members to the fluidized particles to selectively charge the same while in a fluidized state predominately by contact-electrification, the particles of a particular constituent of the mixture having a charge of given polarity different from the charge on the particles of other constituents, electrode means including a pair of vertically spaced electrodes for establishing an electrostatic extracting field adjacent said fluidized particles, one of said electrodes being positioned within said container and the other electrode being located above the upper portion of said container, said extracting field separating the particles of said given polarity from the remaining particles in said bed and withdrawing the separated particles in an upward direction out of the open top of said container, and means in spaced relationship with the upper portion of said container for collecting the thus withdrawn particles.

References Cited

UNITED STATES PATENTS

| | | | |
|---|---|---|---|
| 2,116,613 | 5/1938 | Bedford | 209—131 |
| 2,300,324 | 10/1942 | Thompson | 209—127 |
| 2,786,635 | 3/1957 | Oishi | 209—127 X |
| 2,805,769 | 9/1957 | Lawver | 209—127.1 |
| 2,805,770 | 9/1957 | Lawver | 209—127.1 |
| 2,889,042 | 6/1959 | Le Baron | 209—127 |
| 2,889,055 | 8/1959 | Le Baron | 209—127 |
| 3,291,301 | 12/1966 | Brastad | 209—129 X |

FOREIGN PATENTS 143,744    4/1962    U.S.S.R.

FRANK W. LUTTER, *Primary Examiner.*